United States Patent [19]

Le Brasseur, nee Nicoud et al.

[11] 3,882,058

[45] May 6, 1975

[54] PHOTODEGRADABLE POLYMERIC COMPOSITIONS CONTAINING A MIXTURE OF AN IRON SALT AND SULFUR OR A DIALKYL POLYSULFIDE

[75] Inventors: Geneviève Le Brasseur, nee Nicoud, Bully-les-Mines; Adrien Nicco, Bethune, both of France

[73] Assignee: Ethylene Plastique, Courbevoie, France

[22] Filed: Sept. 14, 1973

[21] Appl. No.: 397,272

[30] Foreign Application Priority Data
Sept. 20, 1972 France .............................. 72.33361

[52] U.S. Cl..... 260/23 H; 260/45.7 S; 260/45.75 P; 260/DIG. 43
[51] Int. Cl.......................... C08f 45/36; C08f 45/46
[58] Field of Search.... 260/DIG. 43, 45.75 R, 23 H, 260/45.75 P, 45.7 S

[56] References Cited
UNITED STATES PATENTS

| | | | |
|---|---|---|---|
| 2,982,756 | 5/1961 | Mercier et al. | 260/45.95 |
| 3,143,584 | 8/1964 | Roberts et al. | 260/45.95 |
| 3,299,568 | 1/1967 | Tobolsky et al. | 47/9 |
| 3,454,510 | 7/1969 | Newland et al. | 260/23 |
| 3,676,401 | 7/1972 | Henry | 260/63 |

*Primary Examiner*—Eugene C. Rzucidlo

[57] ABSTRACT

The invention provides a photodegradable composition comprising a polymer of monoethylenically unsaturated hydrocarbon monomer and, as additives, an iron salt in an amount of 10 to 200 mg per kg of polymer and either sulphur or a dialkyl-polysulphide in an amount of 10 to 1000 mg per kg of polymer. The compositions degrade upon prolonged exposure to the atmosphere but are stable under processing conditions.

3 Claims, No Drawings

PHOTODEGRADABLE POLYMERIC COMPOSITIONS CONTAINING A MIXTURE OF AN IRON SALT AND SULFUR OR A DIALKYL POLYSULFIDE

The present invention relates to compositions which undergo controlled photodegradation.

There is considerable pollution caused by discarded plastics articles, such as packagings, mugs and bottles, and by polymer films used in agriculture for mulching or for protecting crops. The articles are generally stable to aging under natural conditions and do not break down even upon prolonged aging. It would be desirable if such articles could be fabricated from photodegradable compositions in order that they could break down upon exposure to atmospheric conditions into little pieces which could readily be incorporated into the earth, for example by hoeing or ploughing.

Various photodegradable systems have been described. Thus attempts have been made to prepare photodegradable copolymers of a monoethylenically unsaturated hydrocarbon monomer with at least one other copolymerisable monomer. These copolymers are useful but their production poses technical and economic problems. Photodegradable compositions have been prepared by incorporating photosensitising organic compounds, such as benzophenone, in polymers of monoethylenically unsaturated hydrocarbon monomers. These compositions suffer the disadvantages that the photosensitising compounds are difficult to incorporate in the polymer, resulting in sweating, and that the compositions tend to degrade too soon. Organic salts, which may be stable or labile to heat, of certain metals such as iron have also been used as photosensitising agents. These salts have a known photodegrading effect but they cause rapid thermal oxidation and degradation of the polymers during processing.

It should be noted, furthermore, that ions of metals such as iron activate the oxidation of numerous organic compounds and have a catalytic effect on the thermal oxidation of polyethylene. The addition of antioxidants, at the same time as iron salts, causes, at the temperatures for processing polyethylene (160°–230°C.), a rapid reaction between the two additives and the formation of more or less stable complex compounds. These complexes are capable of protecting polyethylenes, and more generally polyolefins, at the start of the photo-oxidation reactions, and then of causing rapid degradation of the polymer. However, the chemical reaction mentioned above, which results in the formation of the complexes, leads to results which vary according to the methods of incorporating the additives in the polymer, and thus to final products which have varying photodegradation properties. Finally, it must be mentioned that the rates of photodegradation which can be achieved with such complexes are limited.

The present invention provides compositions which can be rapidly photodegraded but which are stable within the temperature range at which they are to be processed.

The present invention provides a photodegradable composition which comprises (i) a polymer of a monoethylenically unsaturated hydrocarbon monomer, (ii) 10 to 200 mg of at least one iron salt per kg of the polymer and (iii) 10 to 1,000 mg of sulphur or a dialkyl polysulphide per kg of the polymer.

The iron salt (ii) preferably is an organic salt such as ferric naphthenate, ferric salicylate or a ferric salt of a linear or branched, saturated or unsaturated aliphatic carboxylic acid of 2 to 22 carbon atoms, such as ferric formate, ferric acetate and ferric stearate. The additive (iii) is either sulphur itself (flowers of sulphur) or a dialkyl polysulphide, preferably of the formula $R-S_n-R$ in which R is an alkyl group of 1 to 20 carbon atoms and $n$ is an integer between 4 and 10. Mixtures of sulphur and one or more dialkyl polysulphide or mixtures of dialkyl polysulphides can be used also.

The polymers which can be rendered photodegradable according to the present invention are polymers of monoethylenically unsaturated hydrocarbon monomers such as ethylene, propylene, but-l-ene and styrene. The polymers can be homopolymers, such as high and low density polyethylenes, polypropylene, polybutene and polystyrene, or copolymers of the hydrocarbon monomers with one another or with other copolymerisable monomers such as vinyl acetate, vinyl chloride, methyl vinyl ether, ethyl vinyl ether, acrylonitrile, acrylic esters, carbon monoxide and sulphur dioxide. Ternary copolymers of the acrylonitrile/butadiene/styrene type can also be used. The copolymers which can be used according to the invention can be random, block or graft copolymers.

It has been found that the additives (ii) and (iii) used according to the present invention do not react with one another at the temperatures, generally below about 200°C., used for converting the polymers into finished or semi-finished products. This absence of interaction makes it possible to prepare products with reproducible properties. When it is necessary to heat the compositions of the invention to temperatures above 200°C., it will be noted that the reaction products formed have only a slight photo-oxidising action and thus do not contribute significantly to the photodegradation of the polymer. The rate of photodegradation of products produced from the compositions of the invention can be controlled by changing the relative amounts of additives added, as demonstrated in the Examples and Comparative Examples.

It is possible to add other known additives, such as anti-oxidants and slip agents to the polymer used. It should be noted, however, that if the polymers contain conventional anti-oxidants, such as phenolic derivatives, a certain amount of complexing of the iron salt (ii) with the anti-oxidants can take place. Under these conditions, in order to achieve the same rate of photodegradation, everything else being equal, it will be necessary to use a larger amount of iron salt (ii) with a polymer containing such anti-oxidants than with a polymer which does not contain any such anti-oxidants.

The compositions of the invention can be prepared in a conventional manner by mixing intimately the polymer (i) and the additives (ii) and (iii). This mixing can be effected, for example by kneading or calendering, at a temperature such that the additives do not decompose. Although the order in which the additives are introduced into the polymer is not controlling, the additive (iii) preferably is introduced first, followed by the iron salt (ii).

The following Examples and Comparative Examples serve to illustrate the invention. In the Examples and Comparative Examples the following methods were used:

The polymer and the additives are blended at the chosen temperature for a definite period in a small laboratory Brabender mixer (polyethylene: 20 mins. at 120°; polypropylene: 2 mins. at 190°C.).

The composition obtained is ground in a Thomas Wiley grinder and then moulded in the form of a sheet 500 μ thick.

Dumb-bell shapes are cut out of the sheet, according to the standard specification for the determination of mechanical properties (NF T 034).

The mechanical properties tested, namely the elongation at break (EB%) expressed as % of the length of the original test piece, and the breaking load (BL kg/cm$^2$) expressed in kg per square centimetre, are then determined.

The dumb-bell shapes are irradiated at 50°C. for a definite period in a weather-O-meter (WO) of the ATLAS 6000 type. In this apparatus, the composition of the radiation used (xenon lamps with a filter) is very similar to that of radiation from the sun.

After irradiation, the elongation at break of the dumb-bell shapes is measured again and is compared with the measurement made for the same sample before irradiation, this measurement being taken as being equal to 100.

The results given in the Tables are the averages of the results obtained in at least four measurements.

COMPARATIVE EXAMPLE 1

Effect of the addition of an iron salt, used alone, to a low density polyethylene having a melt index of 2 and containing 40 ppm of a conventional anti-oxidant:

Varying amounts of ferric stearate were added to the polyethylene; the mechanical properties of the samples are given in Table 1a.

These results show that the rate of photodegradation of the polyethylene increases with the iron content of the polymer.

However, the stability of these products, during their processing, is not good: Even under the very mild conditions chosen for the preparation of the samples (blending at 120°C., moulding at 190°C.), a marked change in the initial mechanical properties is noted relative to those of the polyethylene without additives, which proves that there is simultaneous crosslinking and degradation.

COMPARATIVE EXAMPLE 2

Effect of the addition of sulphur (in the form of flowers of sulphur), used alone, to a low density polyethylene having a melt index of 2 and containing 40 ppm of a conventional anti-oxidant:

Varying amounts of flowers of sulphur were added to the polyethylene; the mechanical properties of the samples are given in Table 2a.

TABLE 2a

| Test No. | Sulphur in ppm | B L kg/cm$^2$ | E B % |
| --- | --- | --- | --- |
| 1 | 0 | 155 | 680 |
| 5 | 50 | 155 | 660 |
| 6 | 100 | 177 | 720 |
| 7 | 300 | 180 | 730 |

The various samples were then irradiated in a weather-O-meter for varying periods; the elongations at break, after irradiation, are given in Table 2b, based on 100 for the non-irradiated product).

TABLE 2b

| Test No. | Time in hours | 50 | 100 | 170 | 250 | 320 | 450 | 550 |
| --- | --- | --- | --- | --- | --- | --- | --- | --- |
| | Sulphur content ppm | | | | | | | |
| 1 | 0 | 100 | 109 | 101 | 105 | 88 | 63 | 28 |
| 5 | 50 | 103 | 98 | — | 102 | 92 | — | 60 |
| 6 | 100 | 96 | 103 | — | 78 | 99 | — | 74 |
| 7 | 300 | 99 | 93 | — | — | 94 | 86 | 82 |

TABLE 1a

| Test No. | Ferric stearate % g | Iron ppm | E B % | B L kg/cm$^2$ |
| --- | --- | --- | --- | --- |
| 1 | 0 | 0 | 680 | 155 |
| 2 | 16 | 10 | 720 | 161 |
| 3 | 160 | 100 | 600 | 154 |
| 4 | 960 | 600 | 707 | 188 |

The various samples were then irradiated in a weather-O-meter for different periods; the elongations at break after irradiation are given in Table 1b (based on 100 for the non-irradiated product).

TABLE 1b

| Test No. | Time hours Iron content ppm | 50 | 100 | 170 | 250 | 320 | 450 | 550 |
| --- | --- | --- | --- | --- | --- | --- | --- | --- |
| 1 | 0 | 100 | 109 | 101 | 105 | 88 | 63 | 28 |
| 2 | 10 | 88 | 85 | 42 | 27 | 12 | 10 | — |
| 3 | 100 | 86 | 53 | 8 | 13 | 3 | 3 | — |
| 4 | 600 | 85 | 26 | 6 | — | 5 | — | — |

The results obtained show that:

For 100 and 300 ppm of sulphur, a slight crosslinking takes place in the polyethylene; and the effect of the sulphur on the photochemical degradation is not very marked; the sulphur seems rather to protect the polymer and does not cause appreciable degradation.

EXAMPLE 3

Effect of the simultaneous addition of sulphur and ferric stearate to a low density polyethylene having a melt index of 2 and containing 40 ppm of a usual anti-oxidant:

Varying amounts of flowers of sulphur and ferric stearate were added to the polyethylene; the properties of the mixtures, before irradiation, are given in Table 3a together with those of certain mixtures from Comparative Examples 1 and 2:

TABLE 3a

| Test No. | Iron ppm | Sulphur ppm | B L kg/cm² | E B % |
|---|---|---|---|---|
| 3 | 100 | 0 | 155 | 680 |
| 8 | 100 | 10 | 150 | 680 |
| 9 | 100 | 50 | 160 | 700 |
| 10 | 100 | 100 | 160 | 673 |
| 11 | 100 | 300 | 149 | 633 |
| 12 | 100 | 500 | 153 | 646 |
| 13 | 100 | 5,000 | 177 | 736 |
| 14 | 100 | 50 | | |
| 2 | 10 | 0 | 161 | 720 |
| 15 | 10 | 30 | 160 | 600 |

Various of the samples were then irradiated in a weather-O-meter for varying periods; the elongations at break, after irradiation, are given in Table 3b (based on 100 for the non-irradiated product).

It is to be noted that:

For all the Tests 8 to 13, the sulphur and the ferric stearate are added together to fused resin in the mixer; and in Test 14, the sulphur was added first followed, 5 mins. later, by the stearate, without markedly changing the results.

The overall duration of the mixing is 20 mins. at 120°C. for all the tests.

Similar results were obtained by replacing the sulphur with dialkyl polysulphides such as di-(tertiary dodecyl)polysulphide or di-(tertiary dodecyl)disulphide.

We claim:

1. A photodegradable composition which comprises an admixture of (i) a polymer of a monoethylenically unsaturated hydrocarbon monomer, (ii) 10 to 200 mg per kg of the polymer of at least one iron salt selected from the group consisting of ferric naphthenate, a ferric salt of an aliphatic carboxylic acid of 2 to 22 carbon atoms and ferric salicylate and (iii) 10 to 1,000 mg of an additive selected from the group consisting of sulphur and dialkyl polysulphides per kg of the polymer.

2. A composition according to claim 1, wherein the polymer (i) is selected from the group consisting of homopolymers and copolymers of a hydrocarbon monomer selected from the group consisting of ethylene, propylene, but-l-ene and styrene.

3. A composition according to claim 1, wherein the dialkyl polysulphide is of the formula $R-S_n-R$ in which R is an alkyl group of 1 to 20 carbon atoms and $n$ is an integer between 4 and 10.

* * * * *

TABLE 3b

| Test No. | Iron content ppm | Time hours<br>Sulphur content ppm | 50 | 100 | 170 | 250 | 320 | 400 | 550 |
|---|---|---|---|---|---|---|---|---|---|
| 2 | 10 | 0 | 88 | 85 | 42 | 27 | 12 | 10 | — |
| 2a | 10 | 10 | 95 | 92 | 79 | 40 | 15 | — | 5 |
| 2b | 10 | 20 | 102 | 100 | 105 | 73 | 39 | — | 6 |
| 15 | 10 | 30 | 110 | 111 | 116 | 89 | 54 | — | 10 |
| 15a | 10 | 50 | 108 | 115 | 92 | 105 | 44 | — | 13 |
| 3 | 100 | 0 | 86 | 53 | 8 | 13 | 3 | 3 | — |
| 8 | 100 | 10 | 94 | 41 | 11 | 7 | 5 | — | — |
| 9 | 100 | 50 | 89 | 48 | 10 | — | 10 | — | — |
| 10 | 100 | 100 | 91 | 82 | 11 | — | 8 | — | — |
| 10a | 100 | 200 | 103 | 90 | 69 | — | 23 | — | 11 |
| 11 | 100 | 300 | 111 | 95 | — | 97 | 55 | — | 17 |
| 12 | 100 | 500 | 116 | 103 | — | 112 | 112 | — | 36 |
| 13 | 100 | 5,000 | 91 | 89 | 87 | 101 | — | — | 77 |